No. 777,109. PATENTED DEC. 13, 1904.
G. W. KING.
ANIMAL TRAP.
APPLICATION FILED AUG. 22, 1904.
NO MODEL.
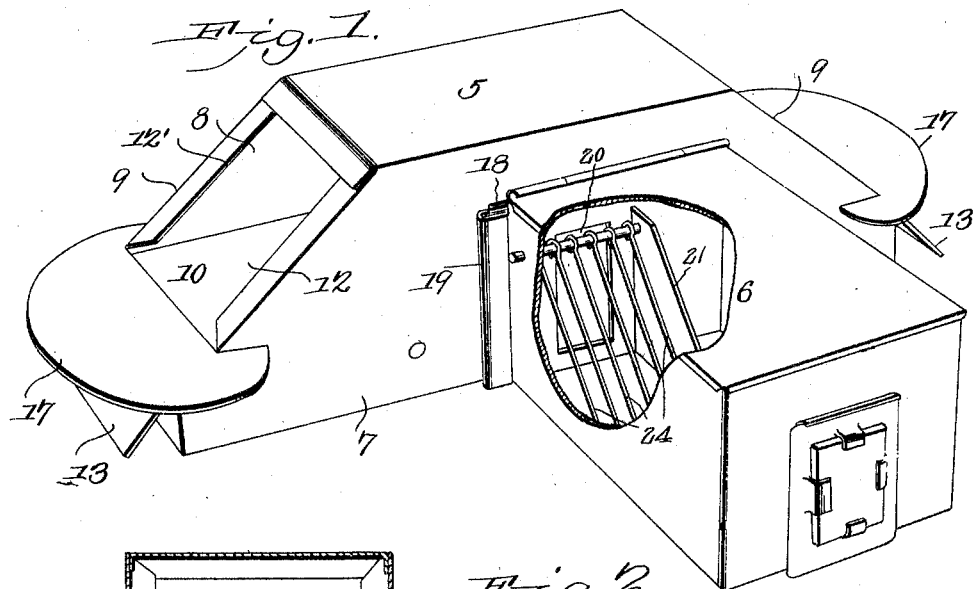
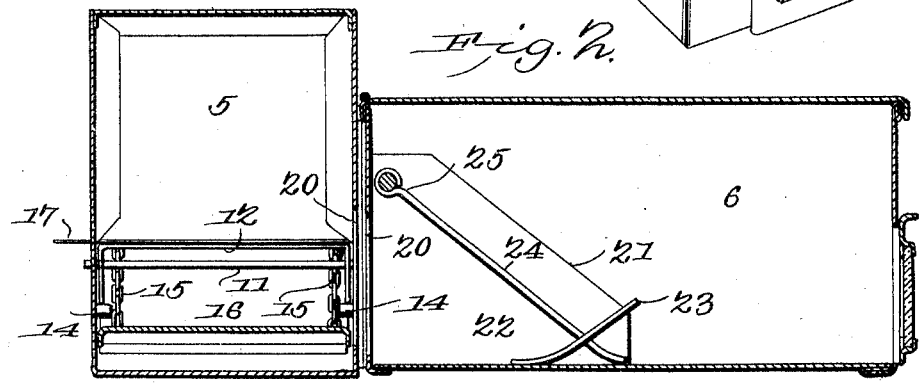
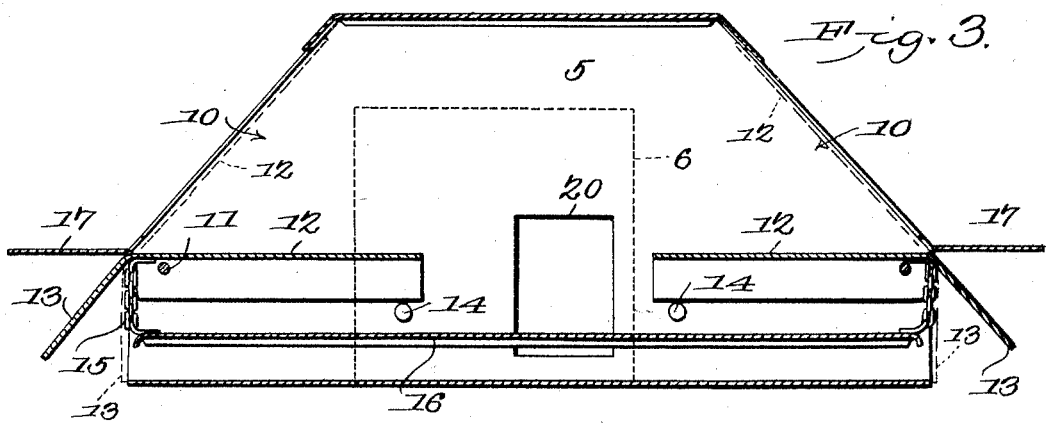
Witnesses
George W. King, Inventor,
by C. A. Snow & Co
Attorneys No. 777,109. Patented December 13, 1904.

UNITED STATES PATENT OFFICE.

GEORGE W. KING, OF LEBANON, MISSOURI, ASSIGNOR OF ONE-HALF TO MELVIN O. VANDEBURG, OF LEBANON, MISSOURI.

ANIMAL-TRAP.

SPECIFICATION forming part of Letters Patent No. 777,109, dated December 13, 1904.

Application filed August 22, 1904. Serial No. 221,781. (No model.)

*To all whom it may concern:*

Be it known that I, GEORGE W. KING, a citizen of the United States, residing at Lebanon, in the county of Laclede and State of Missouri, have invented a new and useful Animal-Trap, of which the following is a specification.

This invention relates to certain improvements in animal-traps, and more particularly to that class known as "self-setting" traps.

The object of the invention is to provide an inexpensive, durable, and efficient trap of the character specified which is extremely simple in construction and positive and reliable in action.

A further object of the invention is to provide a trap having a depressible floor or platform extending the entire length of the trap and having its opposite ends connected by a chain or other flexible medium to a pair of pivoted doors, so that when the animal enters the trap through either door and treads upon the platform the weight of the animal will depress said platform and automatically close the doors, thereby rendering escape impossible.

The invention consists in the construction and novel combination and arrangement of parts hereinafter fully described, illustrated in the accompanying drawings, and pointed out in the claims hereto appended, it being understood that various changes in the form, proportion, and minor details of construction may be resorted to without departing from the principle or sacrificing any of the advantages of this invention.

In the accompanying drawings, Figure 1 is a perspective view of an animal-trap constructed in accordance with my invention. Fig. 2 is a transverse sectional view of the same. Fig. 3 is a longitudinal sectional view.

Similar numerals of reference indicate corresponding parts in all the figures of the drawings.

The device forming the subject-matter of the present invention consists of a trap 5, to which is detachably secured a box or cage 6. The trap proper is preferably rectangular in shape, as shown, and formed of sheet metal or other suitable material, the side walls 7 and 8 of the trap being provided with inclined or converging end walls 9, defining entrance-openings 10. Secured in any suitable manner between the side walls 7 and 8 at each end of the trap is a transversely-disposed rod or bar 11, and pivotally mounted on said rods are inwardly-opening doors 12, which engage laterally-disposed flanges 12', formed on the end walls 9, when said doors are in closed position. The doors 12 are provided with angular extensions 13 and are normally held in a horizotal plane by inwardly-extending pins or lugs 14, upon which said doors rest. Suspended from the doors 12 by means of a chain or other flexible medium 15 is a platform 16, which preferably extends the entire length of the trap and is designed to receive the weight of the animal. The platform 16 is suspended from the doors 12 slightly in advance of their pivotal points, so that an animal entering the trap from either end thereof and treading upon the platform will depress the latter and automatically close the doors, thereby rendering escape of the animal impossible. Secured to each end of the trap is an extension or rigid platform 17, preferably arranged in alinement with the doors 12 when the latter are open, said platforms also serving as guards for the angular extensions of the pivoted doors, thereby preventing the animal from coming in contact therewith and accidentally springing the trap. The angular extensions 13 of the doors 12 are designed to close that portion of the trap between the platform 17, so as to prevent the ingress of light and cause the animal to seek refuge in the cage or box 6.

The cage or box 6 is provided with laterally-projecting flanges 18, which engage suitable guides 19, secured to the side wall 7 of the trap, said trap and cage being provided with coincident openings or doors 20, through which the animal passes from the trap to said cage. A partition 21 is arranged within the cage 6, defining a passage or runway 22, and mounted in said passage are a plurality of upwardly-extending inclined teeth 23, which act in conjunction with the oppositely-inclined teeth 24 of a pivoted door 25 to prevent the escape of the animal after it once enters the cage.

The operation of the trap is obvious from the foregoing, it being understood that as soon as an animal enters the trap its weight will depress the platform, thus keeping the doors closed, and as soon as it enters the cage or box the platform being relieved of its weight will resume its normal position with the doors open, thus leaving the trap set.

Having thus described the invention, what is claimed is—

1. In a device of the class described, a receptacle provided with entrance-openings, doors pivoted at said openings and normally supported in a substantially horizontal plane within the receptacle, a depressible platform arranged within the latter, and a flexible connection between said doors and platform.

2. In a device of the class described, a receptacle provided with entrance-openings, doors pivoted at said openings and normally supported in a substantially horizontal plane within the receptacle, a continuous depressible platform arranged within the latter, and a flexible connection between said doors and platform.

3. In a device of the class described, a receptacle provided with entrance-openings, doors pivoted at said openings and normally supported in a substantially horizontal plane within the receptacle, a continuous depressible platform extending the entire length of the receptacle, and a flexible connection between said doors and platform.

4. In a device of the class described, a receptacle provided with entrance-openings, inwardly-swinging doors pivoted at said openings and normally supported in a substantially horizontal plane within the receptacle, a continuous depressible platform arranged within the latter, and a flexible medium forming a pivotal connection between said doors and the opposite ends of the platform.

5. In a device of the class described, a receptacle provided with entrance-openings, inwardly-swinging doors pivoted at said openings and having their outer ends provided with angular extensions and their inner ends normally supported in a substantially horizontal plane within the receptacle, a continuous depressible platform, extending between said doors, and a flexible medium secured to each door at one side of its pivotal connection and engaging said platform.

6. In a device of the class described, a receptacle provided with laterally-extending flanges defining entrance-openings, inwardly-swinging doors pivoted at said openings and adapted to engage said flanges when in closed position, a continuous depressible platform extending the entire length of the receptacle, and a flexible connection between the doors and platform, said doors being normally supported in a horizontal plane within the receptacle.

7. In a device of the class described, a receptacle provided with laterally-extending flanges defining entrance-openings, inwardly-swinging doors pivoted at said openings and normally supported in a substantially horizontal plane within the receptacle, platforms rigidly secured to the receptacle and forming a continuation of said doors when the latter are open, a continuous depressible platform arranged within the receptacle, and a flexible connection between said doors and depressible platform.

8. In a device of the class described, a main receptacle provided with entrance-openings and oppositely-disposed guiding-flanges, inwardly-swinging doors pivoted at said openings and normally supported in a substantially horizontal plane within the receptacle, a continuous depressible platform arranged within the receptacle, a flexible connection between said doors and platform, and a cage or auxiliary receptacle provided with laterally-extending flanges adapted to engage the flanges in the main receptacle, said receptacle being provided with coincident openings or doors.

In testimony that I claim the foregoing as my own I have hereto affixed my signature in the presence of two witnesses.

GEORGE W. KING.

Witnesses:
W. I. WALLACE,
I. K. KELLERMAN.